(12) United States Patent
Morrison et al.

(10) Patent No.: US 11,928,268 B2
(45) Date of Patent: Mar. 12, 2024

(54) TRACKBALL DEVICE INCLUDING AN ADAPTIVE BRAKE

(71) Applicant: Dell Products L.P., Round Rock, TX (US)

(72) Inventors: Jason Scott Morrison, Chadron, NE (US); Erik Summa, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 0 days.

(21) Appl. No.: 17/647,849

(22) Filed: Jan. 13, 2022

(65) Prior Publication Data
US 2023/0221809 A1    Jul. 13, 2023

(51) Int. Cl.
*G06F 3/0354* (2013.01)

(52) U.S. Cl.
CPC ................................ *G06F 3/03541* (2013.01)

(58) Field of Classification Search
CPC .................................................. G06F 3/03541
See application file for complete search history.

(56) References Cited

U.S. PATENT DOCUMENTS

2005/0007347 A1* 1/2005 Anastas .............. G06F 3/03549
345/167
2011/0263377 A1* 10/2011 Wu ........................ B60B 19/14
476/36

* cited by examiner

*Primary Examiner* — Amit Chatly
(74) *Attorney, Agent, or Firm* — Norton Rose Fulbright US LLP

(57) ABSTRACT

This disclosure provides systems, methods, and apparatuses for a trackball including an adaptive brake. In an aspect, an apparatus includes a trackball, a wheel coupled to the trackball and configured to rotate about an axis, and a brake system configured to apply a braking force to the wheel. In some aspects, the brake system includes a magnetorheological fluid (MRF) brake, such as an MRF rotational brake. The MRF brake may be configured to apply a braking force to the wheel.

11 Claims, 8 Drawing Sheets

TRACKBALL DEVICE INCLUDING AN ADAPTIVE BRAKE

FIELD OF THE DISCLOSURE

The instant disclosure relates to user input devices and systems. More specifically, portions of this disclosure relate to an adaptive trackball for information handling systems.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

User input devices, including a trackball device or a handheld videogame controllers, are used when operating various computer applications to enable users to provide input to operate various functions of a computer application. For example, a gaming controller can operate in conjunction with a gaming device to enable a user to provide input into an application, such as a video game, to control an object or character, select audio and/or video content, or otherwise control aspects related to the gaming device. Users of input devices vary in preference of the style of the input device. For example, some users may prefer to use a conventional mouse as an I/O pointing device due to the precision and quick response of the mouse; however, the mouse typically requires a large flat surface. Some users prefer to use specially designed input device equipment, such as a gaming chair that includes multiple input device. However, such gaming chairs limit the user to a seated position and require sufficient space for the gaming chair. Other users may prefer to have greater freedom of location and do not want to be limited by needing a large flat surface. Some of those users may prefer to use a handheld controller which may include one or more joysticks. However, the precision of a joystick may be less than the precision of a conventional mouse. Users may also select an input device that enhances a user experience. For example, some handheld controllers that provide haptic feedback, such as a controller that a rumble pack that cause the handheld controller to vibrate or shake in conjunction with events during gameplay.

SUMMARY

According to the present disclosure, an input device, may be configured to provide a variable (e.g., adjustable and/or adaptive) braking force. To illustrate, an input device, such as a trackball device, may include a trackball and a wheel coupled to the trackball and configured to rotate about a first axis. In some implementations, the wheel is in contact with the trackball and includes a high-friction material, as compared to conventional low-friction materials used with conventional trackball devices. The input device also includes a brake system configured to apply a braking force to the wheel. For example, the brake system may include a magnetorheological fluid (MRF) brake. In some implementations, the MRF brake includes an MRF rotational brake. The MRF brake may be configured to apply the braking force to the wheel. In some implementations, the input device may include multiple wheels and multiple braking systems. When the braking force is applied to the wheel, movement (e.g., rotation) of the trackball may restricted in a direction associated with rotation of the wheel. The greater the braking force applied to the wheel, the greater the resistance to the rotation of the trackball in the direction associated with rotation of the wheel. In some implementations, an amount of braking force, such as a minimum braking force, a maximum braking force, a range of braking forces, or a combination, thereof may be set by a user.

In some implementations, the wheel may include one or more rollers to maintain movement (e.g., rotation) of the trackball in a direction perpendicular to the direction associated with the rotation of the wheel when a braking force is applied to the wheel. For example, the each roller of the one or more rollers may be positioned about a circumferential portion of the wheel and may be included in a plane that is perpendicular to a plane that includes the axis. When the one or more rollers include multiple rollers, the multiple rollers may be radially spaced about the circumferential portion of the wheel.

As described herein, the input device configured to provide a variable (e.g., adjustable and/or adaptive) braking force may enable the input device to provide resistance to the trackball. The resistance, such as contextual resistance, may be associated with operation of the input device in conjunction with an application executed by an information handling system. The resistance may enable improved operation of the input device and enhance a user experience and interaction with the application.

According to one configuration of the present disclosure, the present disclosure includes an apparatus, such as a user input device. The apparatus includes a trackball, a first wheel coupled to the trackball and configured to rotate about a first axis, and a first brake system configured to apply a first braking force to the first wheel.

Some configuration of the apparatus of the present disclosure can include a housing coupled to the trackball. The housing may define a cavity. In some implementations, the first wheel and the first brake system are positioned within the cavity. Additionally, or alternatively, the trackball is a sphere and has multiple degrees of freedom, such as three degrees of freedom. In some implementations, the trackball may have more than three degrees of freedom, such as four degrees of freedom based on the trackball configured to be pressed by a user to move the ball lineally along a rotational axis.

In some configurations of the apparatus of the present disclosure, the first wheel includes one or more rollers configured to contact the trackball. In some implementations, the one or more rollers include a plurality of rollers positioned and radially spaced about a circumferential portion of the first wheel. Additionally, or alternatively, each roller of the one or more rollers has a roller axis about which the roller is configured to rotate, and each roller axis is offset from the first axis, and each roller of the one or more rollers is included in a plane that is perpendicular to a plane that include the first axis.

In some configurations of the apparatus of the present disclosure, the first wheel is configured to contact the trackball. Additionally, or alternatively, the first wheel may include a material having a coefficient of friction such that rotation of the trackball in a direction perpendicular to the first axis causes rotation of the first wheel about the first axis.

In some configurations of the apparatus of the present disclosure, the first brake system includes a magnetorheological fluid (MRF) brake. In some implementations, the MRF brake includes an MRF rotational brake. The MRF brake may be configured to apply the first braking force to the first wheel.

Some configuration of the apparatus of the present disclosure can include a second wheel coupled to the trackball and configured to rotate about a second axis. The apparatus can also include a second brake system configured to apply a second braking force to the second wheel. In some implementations, the apparatus may further include a third wheel coupled to the trackball and configured to rotate about a third axis, and a third brake system configured to apply a third braking force to the third wheel.

Some configuration of the apparatus of the present disclosure can include an optical sensor configured to detect movement of the trackball. The apparatus may also include a controller coupled to the optical sensor and configured to control operation of the first braking system. The controller may be configured to perform one or more operations. For example, the controller may be configured to receive, from the optical sensor, position data associated with operation of the trackball, receive, from an information handling system, a first input associated with a display, the display based on the operation of the trackball, generate, based on the first input, a first output associated with the first braking force, and transmit the first output to the first brake system to cause the first braking force to be applied to the first wheel. Additionally, or alternatively, some configuration of the apparatus of the present disclosure can include a mounting assembly configured to couple the first braking system in position with respect to the first wheel, an interface configured to communicate with an information handling system, or a power source coupled to the controller, the first braking system, or a combination thereof.

Some configurations of the present disclosure may include a system, such as a gaming system. The system may include an information handling system and a user input device. The user input device is configured to communicate with the information handling system. The user input device includes a trackball, a wheel coupled to the trackball and configured to rotate about an axis, and a brake system configured to apply a braking force to the wheel. In some configurations of the system of the present disclosure, the information handling system may include the user input device.

Some configuration of the system of the present disclosure can include a processor coupled to the brake system. The process may be configured to perform one or more operations. For example, the processor may be configured to receive a first input associated with a display, the display based on operation of the trackball, generate, based on the first input, a first output associated with a first braking force, and transmit the first output to the brake system to cause the first braking force to be applied to the wheel. Additionally, or alternatively, the processor may be configured to receive a second input associated with the display, generate, based on the second input, a second output associated with a second braking force, the second braking force different from the first braking force, and transmit the second output to the brake system to cause the second braking force to be applied to the wheel.

Some configurations of the present disclosure may include a method of operating an input device, such as a trackball device. The method may include receiving a position input associated with operation of a trackball of a device, and receiving, from an information handling system, a first input associated with a display, the display based on the operation of the trackball. The method may also include generating, based on the first input, a first output associated with a first braking force, and transmitting the first output to a brake system of the device to cause the first braking force to be applied to a wheel of the device, the wheel coupled to the trackball.

The method may be embedded in a computer-readable medium as computer program code comprising instructions that cause a processor to perform operations corresponding to the operations of the method. In some implementations, the processor may be part of an information handling system. Additionally, or alternatively, the processor may be part of the input device.

Some configuration of the method of the present disclosure can include receiving, from the information handling system, a second input associated with the display. The method may also include generating, based on the second input, a second output associated with a second braking force, and transmitting the second output to the brake system to cause the second braking force to be applied to the wheel of the device. In some implementations, the second braking force is different from the first braking force. To illustrate, an amount of the second braking force may be greater than or less than an amount of the first braking force.

According to another configuration, a method may include manufacturing, constructing, operating, or otherwise using the configurations of the present disclosure, such as the described input devices, trackball devices, information handling systems, gaming systems, or the like. For example, the method may include one or more operations (e.g., coupling, connecting, etc.) to provide an input device including a trackball, a first wheel coupled to the trackball and configured to rotate about a first axis, and a first brake system configured to apply a first braking force to the first wheel. As another example, the method may include one or more operations (e.g., coupling, connecting, etc.) to provide an information handling system having an input device including a trackball, a first wheel coupled to the trackball and configured to rotate about a first axis, and a first brake system configured to apply a first braking force to the first wheel.

As used herein, the term "coupled" means connected, although not necessarily directly, and not necessarily mechanically; two items that are "coupled" may be unitary with each other. The terms "a" and "an" are defined as one or more unless this disclosure explicitly requires otherwise. The term "substantially" is defined as largely but not necessarily wholly what is specified (and includes what is specified; e.g., substantially parallel includes parallel), as understood by a person of ordinary skill in the art.

The phrase "and/or" means "and" or "or". To illustrate, A, B, and/or C includes: A alone, B alone, C alone, a combination of A and B, a combination of A and C, a combination of B and C, or a combination of A, B, and C. In other words, "and/or" operates as an inclusive or.

Further, a device or system that is configured in a certain way is configured in at least that way, but it can also be configured in other ways than those specifically described.

The terms "comprise" (and any form of comprise, such as "comprises" and "comprising"), "have" (and any form of have, such as "has" and "having"), and "include" (and any form of include, such as "includes" and "including") are open-ended linking verbs. As a result, an apparatus or system that "comprises," "has," or "includes" one or more elements possesses those one or more elements, but is not limited to possessing only those elements. Likewise, a method that "comprises," "has," or "includes," one or more steps possesses those one or more steps, but is not limited to possessing only those one or more steps.

The foregoing has outlined rather broadly certain features and technical advantages of the present disclosure in order that the detailed description that follows may be better understood. Additional features and advantages will be described hereinafter that form the subject of the claims of the disclosure. It should be appreciated by those having ordinary skill in the art that the conception and specific implementation disclosed may be readily utilized as a basis for modifying or designing other structures for carrying out the same or similar purposes. It should also be realized by those having ordinary skill in the art that such equivalent constructions do not depart from the spirit and scope of the disclosure as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

DETAILED DESCRIPTION

Figure 1:
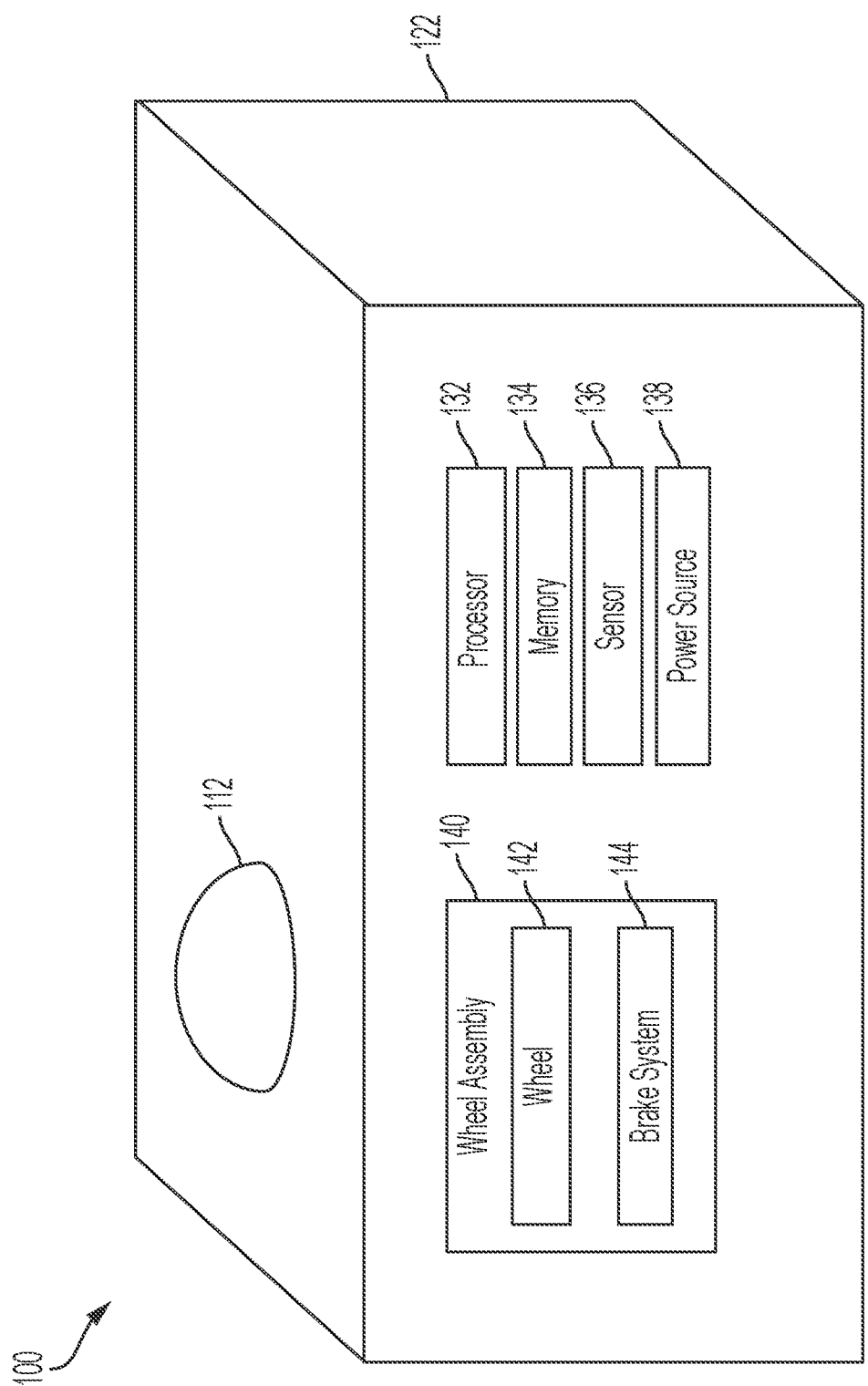
FIG. 1 is a schematic diagram of an example of a user input device according to one or more aspects of the present disclosure.

Referring to FIG. 1, a schematic diagram of an example of a user input device is shown and generally designated 100. User input device 100 (referred to herein as "device 100") includes a trackball 112, a housing 122, a wheel assembly 140, and one or more components. In some implementations, the one or more components include a processor 132, a memory 134, a sensor 136, a power source 138, an interface (e.g., a communication interface) (not shown), or a combination thereof. Although device 100 is described as including the one or more components, in other implementations, device 100 may not include at least one of the one or more components. In some implementations, processor 132 and memory 134 may be included in the same component, such as a controller (also referred to as a controller device).

Trackball 112 that can be manipulated by a user for controlling or otherwise interacting with an electronic application (e.g., video game or other application). In some implementations, trackball 112 may be a sphere; however, other shapes are possible, such as cylindrical, egg-shaped, etc. Additionally, or alternatively, the trackball may have one or more degrees of freedom. In some implementations, trackball 112 is configured to contact one or more contact points configured to maintain a position of trackball 112 such that trackball 112 can be manipulated (e.g., rotated) by a user.

Housing 122 defines a chamber or cavity configured to accommodate at least a portion of trackball 112, at least a portion of wheel assembly, the one or more components, or a combination thereof. In some implementations, housing 122 is coupled to trackball 112. Housing 122 can include or correspond to a trackball housing, a gaming controller housing, or the like.

Wheel assembly 140 includes a wheel 142 and a brake system 144. In some implementation, wheel 142 and brake system 144 are positioned within the cavity defined by housing 122. Wheel assembly 140, such as wheel 142, may be coupled to trackball 112. In some implementations, wheel 142 is configured to rotate about an axis and is configured to contact trackball 112. For example, wheel 142 may be a contact point configured to maintain a position of trackball 112. In some implementations, a material of wheel 142 may have a coefficient of friction (with respect to a material of trackball 112) such that rotation of trackball 112 in a direction perpendicular to an axis of rotation of wheel 142 causes rotation of wheel 142 about the axis. Stated in a different manner, when wheel 142 is in a non-braked state, rotation of trackball 112 in a rotational direction of wheel 142 causes wheel 142 to rotate about its axis. Additionally, when wheel 142 is in a braked state, rotation of trackball 112 in a rotational direction of wheel 142 is more difficult than rotation of trackball in the rotational direction of wheel 142 when wheel 142 is in the non-braked state. To illustrate, the material of wheel 142 may have a higher coefficient of friction as compared to a material of a conventional contact point of a trackball that is configured to enable the trackball to rotate freely with respect to the conventional contact point.

Figure 3:
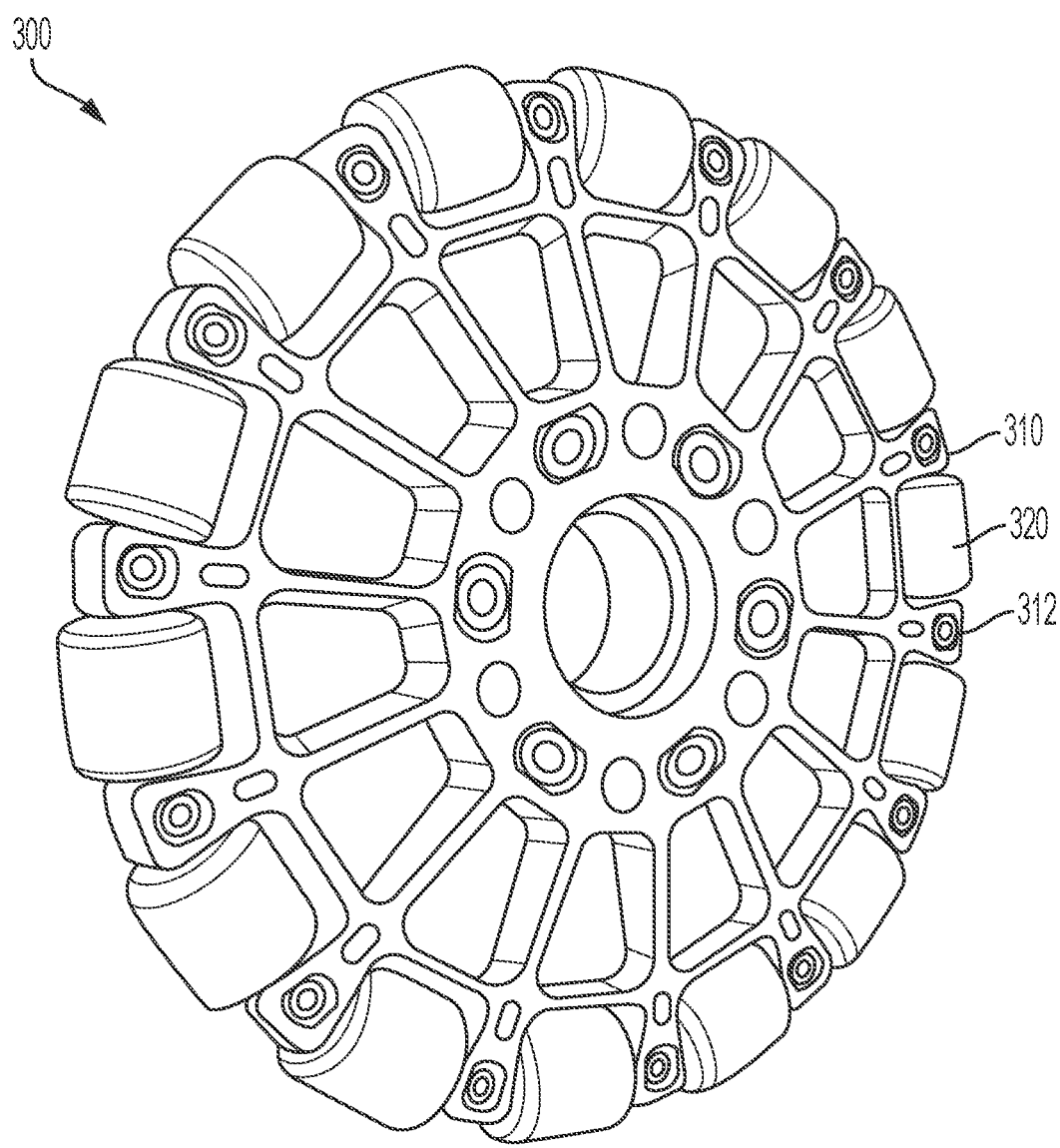
FIG. 3 shows a perspective view of an example of a wheel according to one or more aspects of the present disclosure.

In some implementations, wheel 142 may include one or more rollers, as described further herein at least with reference to FIG. 3. The one or more rollers may be configured to contact trackball 112 and may be configured to enable relatively easy movement of trackball 112 in a first direction while be able to limit movement of trackball 112 in another direction, such as when a braking force is applied to wheel 142.

Brake system 144 includes a brake element that is configured to selectively contact wheel 142 to apply a braking force to wheel 142. In some implementations, the brake system 144 is coupled to wheel 142. The brake element may include a magnetorheological fluid (MRF) brake, such as an MRF rotational brake. The MRF brake may be configured to apply a braking force to wheel 142. The MRF brake may include a fluid with magnetic particles in the fluid, which may be referred to as an MR fluid. The MR fluids can be activated using magnetic field. The MR fluid in an inactive state has a low viscosity as compared the MR fluid in an active state which has a high viscosity. The greater the magnetic field applied to the MR fluid, the higher the viscosity. In some implementations, the MRF brake includes two concentric cylinders, such as an inner cylinder (the drum) that rotates inside an outer cylinder (the spool). A gap (e.g., a space) between the drum and the spool is filled with the MR fluid that applies a controllable braking torque on the drum due to the change in its viscosity as a function of the strength of the applied magnetic field, which is applied by providing a voltage to the spool. In some implementations, the drum of the MRF brake is coupled to or in contact with wheel 142 and rotates with wheel 142. Although the brake element has been described as being the MRF brake, such as description should not be considered limiting and other brake elements may be used. For example, brake element may include a brake pad that is contacted to wheel 142 to apply a braking force.

In some implementations, device 100 includes multiple wheel assemblies (e.g., 140). Each wheel assembly 140 may include a corresponding wheel 142 and a corresponding brake system 144. In some implementations, device includes a single wheel assembly 140. In other implementations, device 100 includes a first wheel assembly and a second wheel assembly. The first wheel assembly includes a first wheel (e.g., 142) coupled to trackball 112 configured to rotate about a first axis and a first brake system (e.g., 144) brake system (e.g., 144) configured to apply a first braking force to the first wheel, and the second wheel assembly includes a second wheel (e.g., 142) coupled to trackball 112 and configured to rotate about a second axis and a second brake system (e.g., 144) configured to apply a second braking force to the second wheel. In some implementations, device 100 may include more than two wheel assemblies. For example, in addition to the first and second wheel assemblies, device 100 may include a third wheel assembly (e.g., 140). The third wheel assembly may include a third wheel (e.g., 142) coupled to trackball 112 and configured to rotate about a third axis, and a third brake system (e.g., 144) configured to apply a third braking force to the third wheel. When multiple wheel assemblies are provided, resistance may be provided and controlled to trackball 112 in multiple directions and independently for each direction—e.g., independent control of the resistance in different directions.

Processor 132 may be a central processing unit (CPU), microcontroller a field-programmable gate array (FPGA) device, an application-specific integrated circuits (ASIC), another hardware device, a firmware device, other computing circuitry or any combination thereof. Memory 134 may include read only memory (ROM) devices, random access memory (RAM) devices, one or more hard disk drives (HDDs), flash memory devices, solid state drives (SSDs), other devices configured to store data in a persistent or non-persistent state, or a combination of different memory devices. Memory 134 may store data, such as trackball position data, voltage data, magnetic field data, torque data, user preference data, game configuration data (e.g., data or instructions from an external gaming device), or the like, as illustrative, non-limiting examples. Additionally, or alternatively, memory 134 may store one or more thresholds such as positional thresholds, rotation thresholds, magnetic field thresholds, voltage thresholds, or the like, as illustrative, non-limiting examples.

Memory 134 may also store instructions that, when executed by processor 132, cause the processor to perform one or more operations associated with device 100. For example, processor 132 may be configured to initiate or cause brake system 144 to apply a braking force to wheel 142. In some implementations, processor 132 may generate a voltage or initiate generation of a voltage that is provided to brake system 144 (e.g., a MRF brake).

As described herein, device 100 is capable of being adjustable according to the preferences of a user, a gaming developer, or the like. Further, device 100 can control a braking force applied to wheel 142 directly or indirectly. For example, wheel 142 and brake system 144 can cooperate to selectively apply a variable braking force to wheel 142 and, thus, provide resistance to movement of trackball 112. In some such configurations, this resistance may be adjusted in real-time based on a user input, an input from a computer application, or both.

Sensor 136 may include one or more sensors configured to generate sensor data associated with operation of device 100. In some implementations, sensor 136 is coupled to trackball 112, wheel assembly 140, processor 132, memory 134, power source 138, housing 122, an interface (e.g., a communication interface), or a combination thereof. Sensor 136 may be configure to detect or track movement of trackball 112, measure torque or a breaking force applied to wheel 142, measure a rotation of wheel 142, measure an amount of power at power source 138, or a combination thereof.

In some implementations, sensor 136 includes an optical sensor configured to detect movement of the trackball. For example, sensor 136 may be configured to measure a position of trackball 112. In some implementations, sensor 136 may measure an angular position of trackball 112. The optical sensor may include a laser sensor, an image capture device, or a combination thereof.

Power source 138 may be coupled to processor 132, memory 134, sensor 136, wheel assembly 140, another device that is included in or external to device 100, or a combination thereof. In some implementations, power source 138 may include a battery, capacitors, a charge storage device, or the like. Power source 138 may be rechargeable (e.g., a rechargeable battery) or removable/replaceable (e.g., a replaceable battery). For example, power source 138 may be a battery, such as a lithium ion battery, a lithium ion polymer (LiPo) battery, a nickel-metal hydride (NiMH) battery, a thin film lithium battery, a zinc battery, or the like. In some configurations, processor 132 may control an amount power (e.g., voltage or current) supplied to brake system 144 by power source 138 in order to adjust a braking force applied to wheel 142.

In some implementations, device 100 includes an interface, such as a communication interface, configured to communicate with an information handling system. Additionally, or alternatively, device 100 may include one or more mounting assemblies configured to couple braking system 144 in position with respect to wheel 142, couple wheel 142 in position with respect to trackball 112, couple one or more components in position with respect to trackball or another component, or a combination thereof. In some implementations, device 100 may be distinct from an information handling system and may be configured to be coupled to, via a wired connection, a wireless connection, or a combination thereof, to the information handling system.

Alternatively, in other implementations, the information handling system includes device 100.

Additionally, or alternatively, device 100 may include one or more additional components, such as a controller housing, a button, thumb cap, one or more sensors, circuitry, or the like, and can include components such as those found in a Stick Controller from ALPS®, various types of game controllers from Microsoft® Xbox® controllers developed by Microsoft Corporation of Redmond, Wash., United States, the PlayStation® DualShock® 3 and 4 controllers, developed by Sony Computer Entertainment, Inc., of Tokyo, Japan, or the like, as illustrative, non-limiting examples.

During operation of device 100, sensor 136, such as an optical sensor, generates position data associated with movement of trackball 112. Processor 132 receives, from sensor 136 (e.g., the optical sensor), the position data associated with operation of trackball 112. Additionally, or alternatively, processor 132 receives, from an information handling system, a first input associated with a display, execution of an application by the information handling system, or a combination thereof. The display and/or the execution of the application may be based on the operation of trackball 112.

Based on the position data, the first input, or a combination thereof, processor 132 generates a first output associated with the first braking force and transmits the first output to brake system 144 to cause the first braking force to be applied to wheel 142. In some implementations, processor 132 generates and sends a signal to control a voltage provided to the brake system 144. Based on the voltage provided to brake system 144, a magnetic field is generated that changes a viscosity of MR fluid to thereby provide a braking force to wheel 142. Based on the braking force applied to wheel 142, trackball 112 encounters resistance in a rotational direction of wheel 142.

In some implementations, the resistance encountered by trackball 112 constitutes a haptic response or haptic feedback that is responsive to operation of device 100 or execution of the application by information handling system. For example, as a user operates device 100 to control a cursor to scroll through a menu, such as a drop-down menu, associated with the application, the braking force applied to wheel 142 will may be adjusted. To illustrate, as the cursor travels towards a center of a menu item, the barking force is increased (linearly, exponentially, or tiered) and, accordingly, an amount of resistance encountered by trackball 112 increases. Additionally, or alternatively, as the cursor travels away from the center of the menu item, the barking force is decreased (linearly, exponentially, or tiered) and, accordingly, an amount of resistance encountered by trackball 112 decreases. As another example, when a zoom-in view of a scene is presented via a display associated with execution of the application, the braking force may be applied to make movement of a cursor or panning of the scene more fine-tuned and precise.

As additional example of a haptic response or haptic feedback, a character of an application, such as a game, may travel across a surface and a braking force may be applied based on terrain. For example, the braking force may be applied when the character is travelling uphill and may not be applied when the character is traveling downhill. To illustrate, an amount of the braking force applied may increase based on a steepness or pitch of terrain. Accordingly, the steeper the uphill travel of the character, the greater the breaking force that is applied. As another example, when the character is traversing uneven terrain, the braking force may be applied or not applied based on the character's interaction with the terrain. To illustrate, when the terrain includes large rocks or boulders, the brakes may be applied when the character is climbing over a boulder and not applied when the character is climbing down the boulder. In some implementations, the amount of the break force applied may increase or decrease based on the character's movement. For example, as a character climbs up a hill or bolder, an amount of break applied may increase to indicate fatigue of or energy exerted by the character. Adjusting the breaking force as described in the examples herein may improve operation and precision of device 100 and increases a user experience.

In some implementations, device 100 includes trackball 112 and wheel 142 coupled to trackball 112. Wheel 142 is configured to rotate about an axis. Device 100 also includes brake system 144 which is configured to apply a braking force to wheel 142. In some implementations, brake system 144 includes an MRF brake. In some implementations, the MRF brake includes an MRF rotational brake. The MRF brake may be configured to apply the braking force to wheel 142. In some implementations, device 100 may include multiple wheels (e.g., 142) and multiple braking systems (e.g., 144).

Although device 100 is described as including trackball 112, in other implementation, trackball 112 may be substituted with a different structure, such as a joystick, a roller, a mouse, a push button, a switch, or other input device. A resistance applied to the different structure may be variably adjusted using a braking system (e.g, 144), such as an MRF brake. For example, the braking system (e.g., 144) may be configured to apply a braking force to the different structure directly or indirectly, such as via one or more other structures or components (e.g., a wheel 142) that is coupled to or in contact with the different structure.

As described herein, device 100 configured to provide a variable (e.g., adjustable and/or adaptive) braking force to enable device 100 to provide resistance to trackball 112. The resistance, such as contextual resistance, may be associated with operation of device 100 in conjunction with an application executed by an information handling system. The resistance may enable improved operation of device 100 and enhance a user experience and interaction with the application.

Figure 2A:
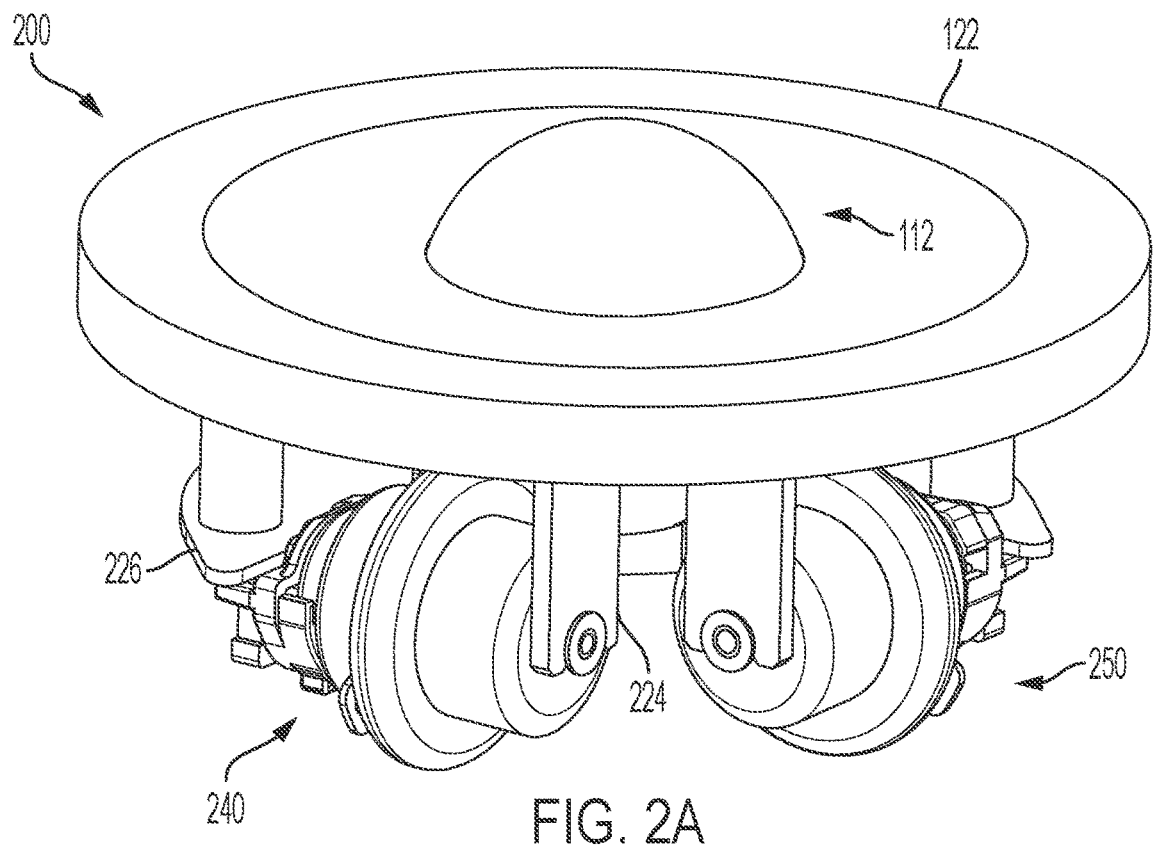
FIGS. 2A and 2B show perspective views of an example of a user input device according to one or more aspects of the present disclosure.
Figure 2B:
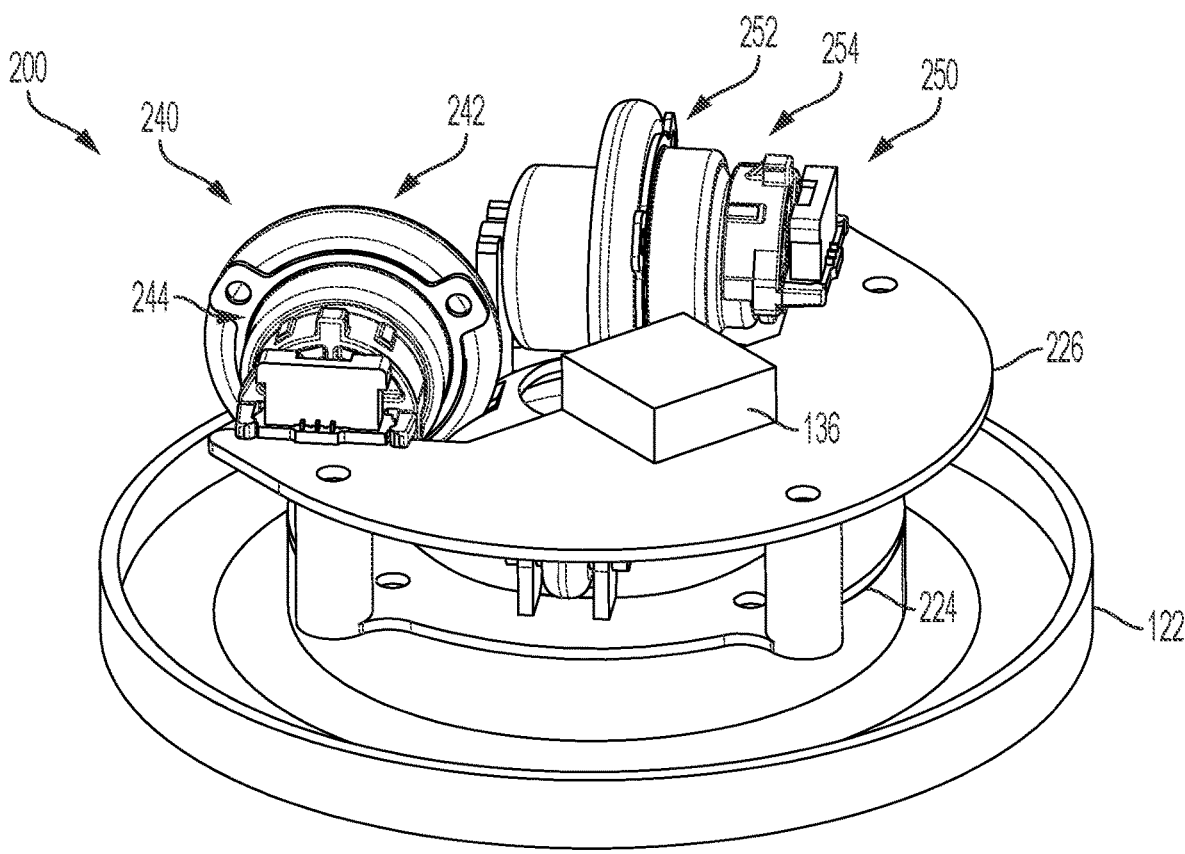

Referring to FIGS. 2A and 2B, perspective views of an example of a user input device (referred to herein as a "device 200") are shown. For example, FIG. 2A shows a top perspective view of device 200 and FIG. 2B show a bottom perspective views of device 200. Device 200 may include or correspond to device 100.

Device 200 includes trackball 112, housing 122, sensor 136, a first wheel assembly 240, and a second wheel assembly 250. It is noted that a portion of housing 122 is shown with respect to FIGS. 2A and 2B. Sensor 136 may include an optical sensor and may be positioned to detect movement of trackball 112.

First wheel assembly 240 may include or correspond to wheel assembly 140. First wheel assembly 240 may be coupled to trackball 112. First wheel assembly 240 includes a first wheel 242 and a first brake assembly 244. First wheel 242 and first brake assembly 244 may include or correspond to wheel 142 and brake system 144, respectively. In some implementations, first wheel 242 is in contact with trackball 112. First brake assembly 244 may include a brake element, such as an MRF brake.

Second wheel assembly 250 may include or correspond to wheel assembly 140. Second wheel assembly 250 may be coupled to trackball 112. Second wheel assembly 250 includes a second wheel 252 and a second brake assembly 254. Second wheel 252 and second brake assembly 254 may include or correspond to wheel 142 and brake system 144, respectively. In some implementations, second wheel 252 is in contact with trackball 112. Second brake assembly 254 may include a brake element, such as an MRF brake.

Device 200 also includes one or more mounting assemblies, such as a first mounting assembly 224 and a second mounting assembly 226. It is noted that although device 200 is shown as having two mounting assemblies, in other implementations, device 200 may have a single mounting assembly or more than two mounting assemblies. The one or more mounting assemblies may be configures to secure and/or position one or more components of device 200.

Device 200 may also include one or more additional components. For example, device 200 may include a controller (not shown). The controller may be coupled a mounting assembly, such as second mounting assembly 226, or other surface. The controller may include or correspond to processor 132, memory 134, or a combination thereof. The controller may be coupled to sensor 136, first wheel assembly 240 (e.g., first brake assembly 244), second wheel assembly 250 (e.g., second brake assembly 254), an interface (e.g., a communication interface), or a combination thereof. The controller may be configured to perform one or more operations as described with reference to processor 132. In some implementations, the controller is configured to control a voltage provided to a brake assembly, such as first brake assembly 244 or second brake assembly, to adjust a braking force applied to a wheel, such as first wheel 242 or second wheel 252, and thereby change a resistance encountered by trackball 112. In some implementation, the controller may include one or more controllers. Additionally, or alternatively, the controller may not be included in the device 200.

FIG. 3 shows a perspective view of an example of a wheel 300. Wheel 300 may include or correspond to wheel assembly 140, wheel 142, first wheel assembly 240, first wheel 242, second wheel assembly 250, second wheel 252, or a combination thereof.

Wheel 300 includes one or more rollers, such as a representative roller 320. Roller 320 is coupled to wheel 300 between a first support 310 and a second support 312. Each roller is configured to contact trackball 112. Each roller of the one or more rollers has a roller axis about which the roller is configured to rotate. Each roller axis is offset from an axis of wheel 300 about which wheel 300 is configured to rotate. In some implementations, each roller of the one or more rollers is included in a plane that is perpendicular to a plane that include the axis of wheel 300. As shown in FIG. 3, wheel 300 includes a plurality of rollers positioned and radially spaced about a circumferential portion of wheel 300.

Wheel is configured to contact trackball 112 and includes a material having a coefficient of friction such that rotation of trackball 112 in a direction perpendicular to the axis of wheel 300 causes rotation of wheel 300 about the axis of wheel 300. In some implementations, the material of wheel 300 includes a material of the one or more rollers. When a braking force is applied to wheel 300, wheel 300 provides resistance to rotation of trackball 112 in a rotational direction of wheel 300 about the axis of wheel 300. However, when the braking force is applied, rollers permit free rotation of trackball 112 in a rotational direction that is perpendicular to the rotational direction of wheel 300 about the axis of wheel 300.

Figure 4:
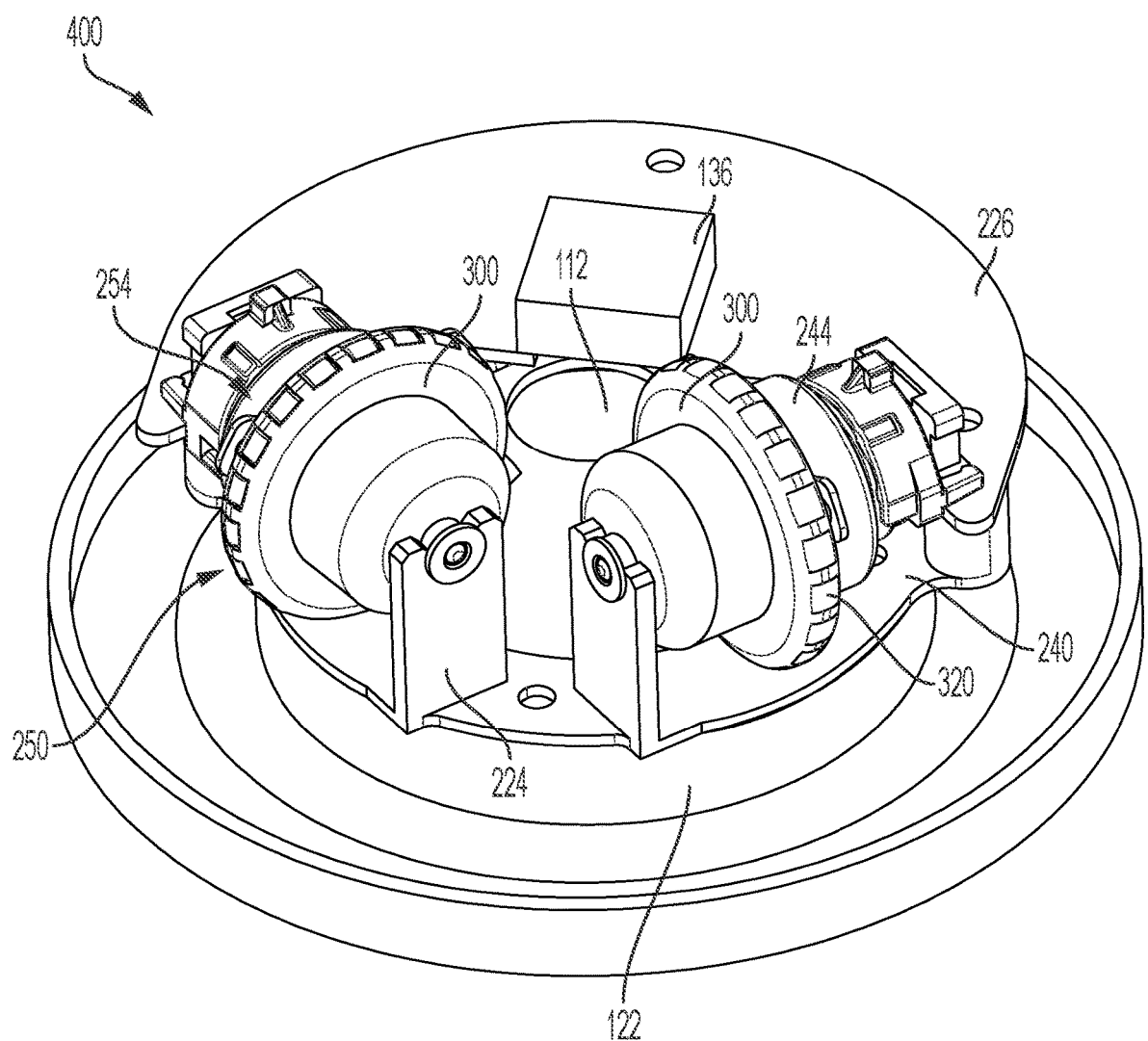
FIG. 4 shows a perspective views of another example of a user input device according to one or more aspects of the present disclosure.

FIG. 4 shows a perspective views of an example of a user input device (referred to hereinafter as a "device 400"). Device 400 may include or correspond to device 100 or 200. As compared to device 200 of FIGS. 2A and 2B, each of first wheel assembly 240 and second wheel assembly 250 includes wheel 300 of FIG. 3. As shown in FIG. 4, wheel 242 of first wheel assembly 240 has been replaced with wheel 300 and wheel 252 of second wheel assembly 250 has been replaced with wheel 300.

Figure 5:
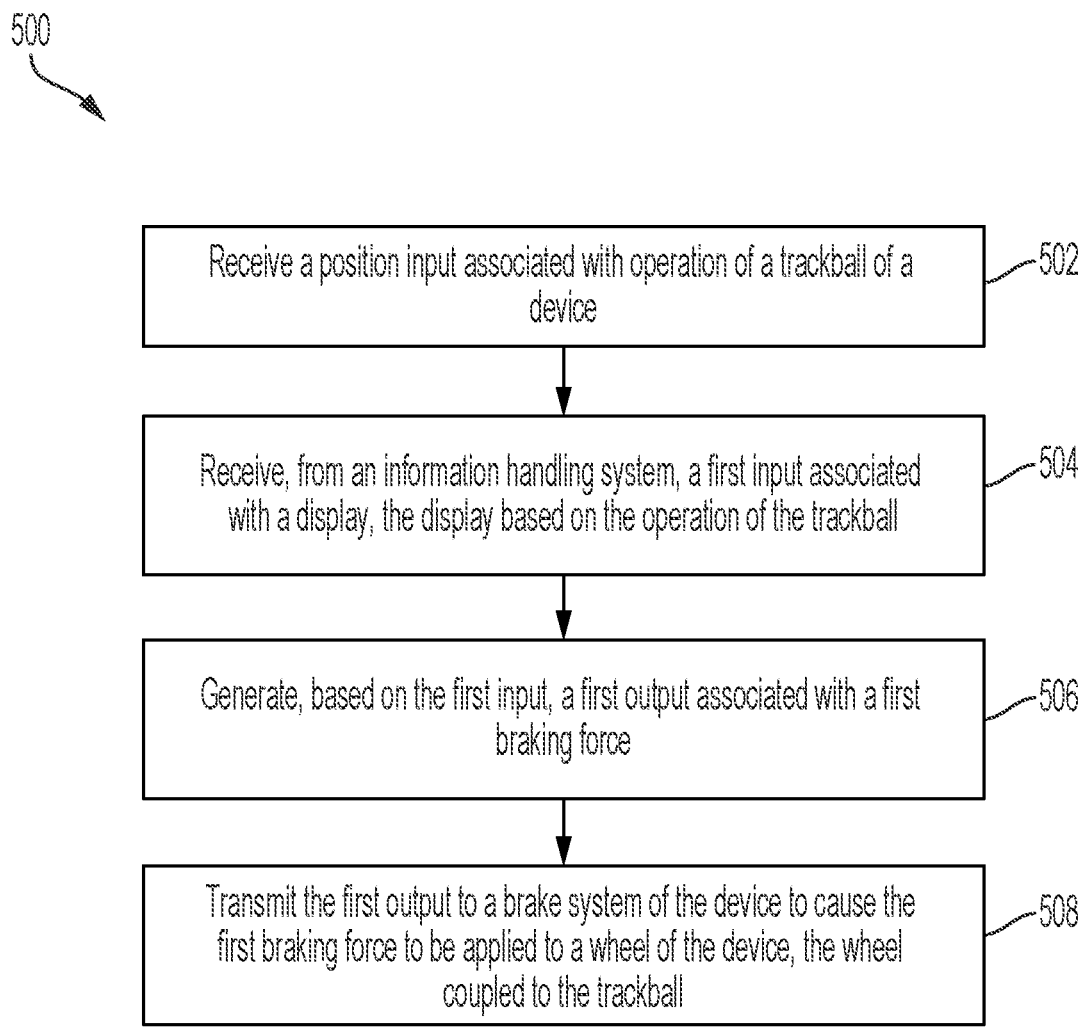
FIG. 5 illustrates a flow diagram of an example of a method of operating a user input device according to one or more aspects of the present disclosure.

Referring to FIG. 5, a method 500 of operating a user input device is shown. Method 500 may be performed at or by the user input device, such as device 100, 200, 400, or the like, or a component of or coupled to the user input device.

Method 500 includes receiving a position input associated with operation of a trackball of a device, at 502. The trackball may include or correspond to trackball 112. The position input may include or correspond to an output, such as a data associated with position, from one or more sensors 136. In some implementations, the received position input includes position data that is output from an optical sensor configured to detect movement of the trackball.

Method 500 further includes receiving, from an information handling system, a first input associated with a display, at 504. The display may be based on the operation of the trackball. The information handling system can include or correspond to a processor configured as a controller, and a memory configured to store one or more instructions that are executed by the processor. In some implementations, the processor and the memory may include or correspond to processor 132 and memory 134, respectively. In some implementations, the first input associated with the display may include or correspond to content presented via the display presented via a display device. To illustrate, the trackball of the user input device may be operated to control, enable, or interact with content presented via the display device.

Method 500 also includes generating, based on the first input, a first output associated with a first braking force, at 506. Additionally, or alternatively, the first output may be generated based on the position input. In some implementations, a value of or represented by the first output indicates a value or amount of the first braking force.

Method 500 includes transmitting the first output to a brake system of the device to cause the first braking force to be applied to a wheel of the device, at 508. The wheel may be coupled to the trackball. In some implementations, the wheel is on contact with the trackball. The braking system may include or correspond to wheel assembly 140, brake system 144, first brake assembly 244, second brake assembly 254, an MRF rotational brake or dampener, or a combination thereof. The wheel may include or correspond to wheel assembly 140, wheel 142, first wheel assembly 240, second wheel assembly 250, wheel 300, or a combination thereof.

In some implementations, method 500 may include receiving, from the information handling system, a second input associated with the display. Method 500 may also include generating, based on the second input, a second output associated with a second braking force. The second output may be transmitted to the brake system to cause the second braking force to be applied to the wheel of the device. In some implementations, the second braking force is different from the first braking force. For example, the second braking force may be greater than or less than the first braking force. In some implementations, method 500 adjust a braking force applied to the wheel from the first braking force to the second braking force.

Method 500 may be embedded in a computer-readable medium as computer program code comprising instructions that cause a processor to perform one or more operations of method 500. In some implementations, the processor may be part of an information handling system including a first network adaptor configured to transmit data over a first network connection; and a processor coupled to the first network adaptor, and a memory storing processor-executable instructions. In some implementations, method 500 may be performed by one or more processors, such as a processor of a user input device, a processor of an information handling system, or a combination thereof.

Figure 6A:
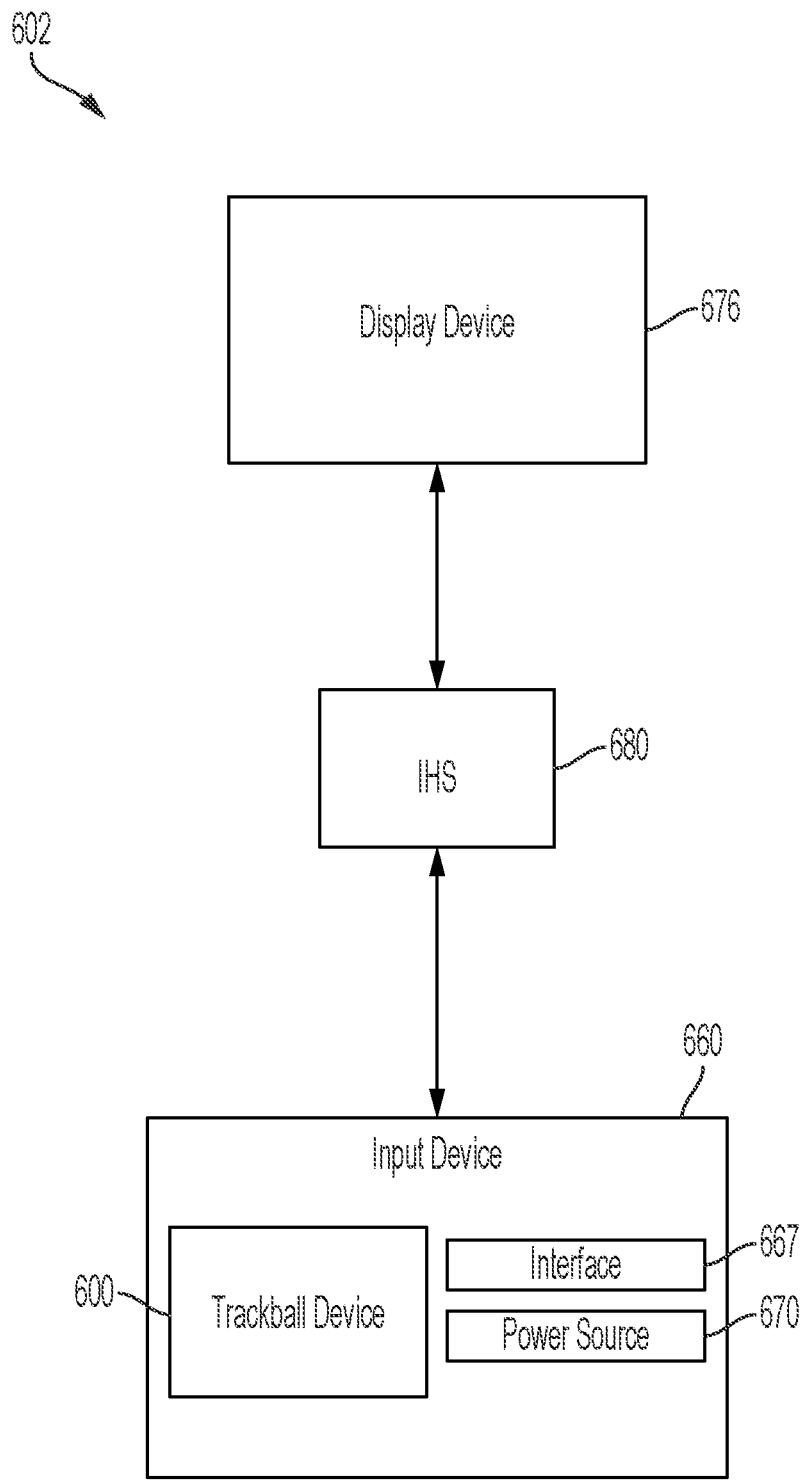
FIGS. 6A and 6B are examples of a system that includes a user input device according to one or more aspects of the present disclosure.
Figure 6B:
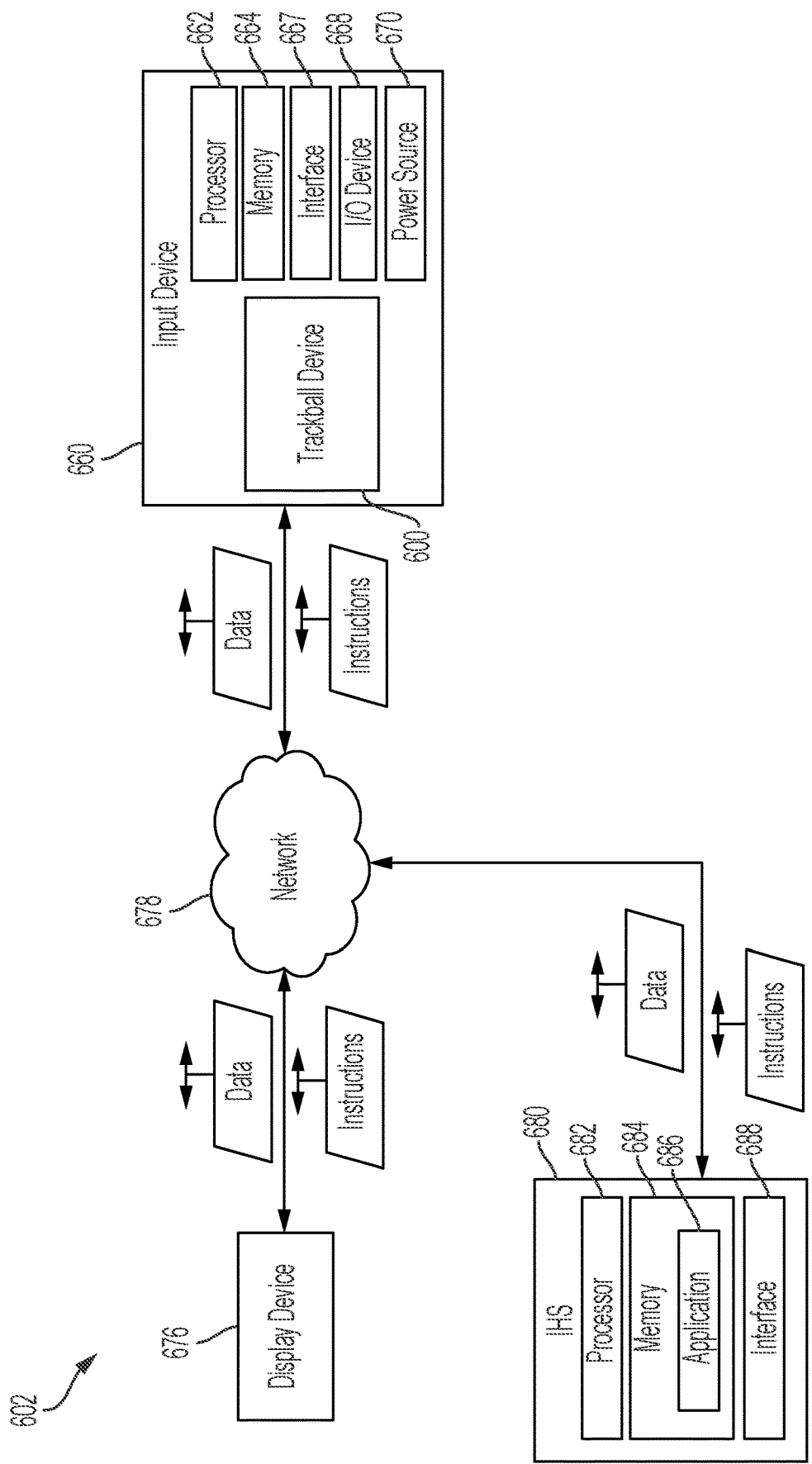

Referring now to FIGS. 6A and 6B, an example of a system that includes a user input device is shown and designated 602. System 602 may be configured to enable an exchange of user input information and feedback information between one or more components or devices of system 602.

System 602 includes one or more input devices (referred to hereinafter as an "input device 660"), one or more display devices (referred to hereinafter as a "display device 676"), and one or more information handling systems (IHS) (referred to hereinafter as an "IHS 680"). Display device 676 may be coupled to IHS 680 via one or more wired or wireless connections. IHS 680 may be coupled to input device 660 via one or more wired or wireless connections.

Display device 676 is configured to display or present one or more images. Display device 676 may include a monitor, television, smart phone, tablet, or the like, as illustrative, non-limiting examples. IHS 680 is configured to execute one or more electronic applications, such as one or more video games, as an illustrative, non-limiting example. IHS 680 may include a computer, a video game console, an entertainment console, an arcade machine, a kiosk, an automated teller machine (ATM), or other device, as illustrative, non-limiting examples.

Input device 660 is configured to communicate via wired or wireless communication with IHS 680. For example, input device 660 is configured to send and receive signals with IHS 680 to navigate or otherwise control one or more operations associated and electronic applications executed by IHS 680. In some implementations, input device 660 may include or correspond to device 100, 200, or 400. For example, input device may include or correspond to a user input device, such as a game controller.

Input device 660 includes a trackball device 600, an interface 667, and a power source 670. Trackball device 600 may include or correspond to device 100, 200, or 400. Interface 667 includes one or more communication interfaces. Power source 670 may be configured to power one or more components of input device 660. In some implementations, power source 670 may be external to input device 660.

Referring to FIG. 6B, additional aspects of system 602 are shown in which input device 660 is a video game controller, IHS 680 is a gaming console, and display device 676 is a television. In some such configurations, the various devices of system 602 (e.g., input device 660, IHS 680, and display device 676) may be communicatively coupled to each other via one or more networks 678, such as a Bluetooth personal area network (PAN), an Ethernet local area network (LAN), a wireless local area network, a wide area network (WAN) or other network, or a combination thereof. In other configurations, display device 676 and/or IHS 680 may be integrated with input device 660.

Input device 660 includes trackball device 600. A user may operate (e.g., rotate) a trackball, such as trackball 112, to provide input data to IHS 680. Input device 660 may also include a processor 662, a memory 664, interface 667, an input/output (I/O) device 668, power source 670, or combination thereof. In some implementations, input device 660 may not include all of the components shown in FIG. 6B, may include additional components, or both.

Processor 662 may be a central processing unit (CPU) or other computing circuitry (e.g., a microcontroller, one or more application specific integrated circuits (ASICs), and the like) and may have one or more processing cores. Memory 664 may include read only memory (ROM) devices, random access memory (RAM) devices, one or more hard disk drives (HDDs), flash memory devices, solid state drives (SSDs), other devices configured to store data in a persistent or non-persistent state, or a combination of different memory devices. Memory 664 may store instructions that, when executed by processor 662, cause processor 662 to perform operations associated with input device 660. Additionally, memory 664 may store one or more thresholds, data, preferences, or other settings. For example, memory 664 may store one or more brake settings, one or more user preferences (e.g., brake amount values), or a combination thereof.

Interface 667, such as a communication interface or a wireless interface, may be configured to enable wireless communication between input device 660 and IHS 680, display device 676, or both. In some implementations, interface 667 include a long range (LoRa) interface, a Wi-Fi interface (e.g., an Institute of Electrical and Electronics Engineers (IEEE) 802.11 interface), a cellular interface (e.g., a fourth generation (4G) or long term evolution (LTE) interface, a fifth generation (5G) new radio (NR) interface, or the like), a Bluetooth interface, a Bluetooth low energy (BLE) interface, a Zigbee interface, a non-LoRa interface, another type of network interface, or the like. I/O device 668 includes one or more switches (e.g., depressible buttons, triggers, or the like), directional pads, one or more touchscreens, a microphone, a camera, one or more speakers, one or more light sources, vibration devices, or other types of devices that enable a user to receive information or data from or provide information or data to input device 660.

IHS 680 is configured to support and operate one or more electronic applications (e.g., 686), such as a video game, video streaming platform, music streaming platform, or other media platform. IHS 680 is referred to broadly and includes any suitable processor-based device such as, for example, video game console, a hand-held console, a desktop computer, a laptop computer, or a mobile computing device a tablet, a digital media or entertainment device, or another type of electronic device. IHS 680 may include a processor 682, a memory 684, and an interface 688 to enable communication with input device 660, and optionally with display device 676.

Processor 682 may be configured to execute instructions stored at memory 684 to cause IHS 680 to perform the operations described herein. In some implementations, IHS 680 can be configured to access a wireless network or the Internet (e.g., via an application on IHS 680) or to access a web application or web service hosted by a server, and thereby provide a user interface for enabling a user to access an application 686. In some configurations, IHS 680 is configured to act as an intermediary between input device 660 and display device 676. For example, IHS 680 may receive a user input from input device 660 and transmit the user input to display device 676 to change the displayed environment (e.g., navigating between icons, rotating a point of view of a character, selecting a visual prompt, or otherwise changing the display environment). In some configurations, IHS 680 is configured to send instructions (e.g., signals) to input device 660 to transmit information to the user. For example, based on a programmable setting of application 686, IHS 680 may transmit one or more instructions to cause trackball device 600 to adjust a braking force applied at trackball device 600.

For purposes of this disclosure, an information handling system may include any instrumentality or aggregate of instrumentalities operable to compute, calculate, determine, classify, process, transmit, receive, retrieve, originate, switch, store, display, communicate, manifest, detect, record, reproduce, handle, or utilize any form of information, intelligence, or data for business, scientific, control, or other purposes. For example, an information handling system may be a personal computer (e.g., desktop or laptop), tablet computer, mobile device (e.g., personal digital assistant (PDA) or smart phone), server (e.g., blade server or rack server), a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communicating with external devices as well as various input and output (I/O) devices, such as a keyboard, a mouse, touchscreen and/or a video display. The information handling system may also include one or more buses operable to transmit communications between the various hardware components.

Figure 7:
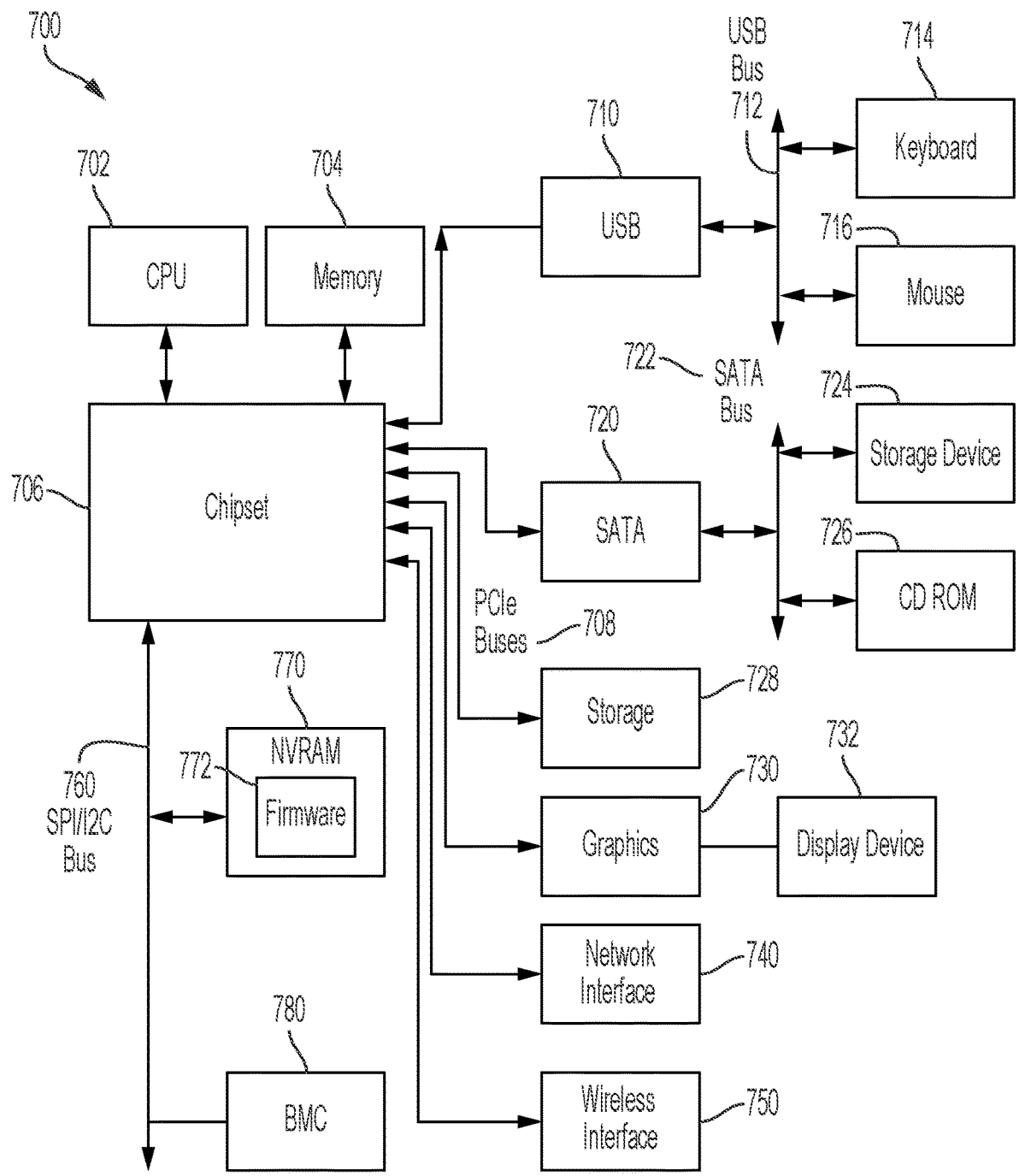
FIG. 7 is a schematic block diagram of an example information handling system according to some embodiments of the disclosure.

FIG. 7 illustrates an example information handling system 700. Information handling system 700 may include a processor 702 (e.g., a central processing unit (CPU)), a memory (e.g., a dynamic random-access memory (DRAM)) 704, and a chipset 706. In some embodiments, processor 702, memory 704, and chipset 706 may be included on a motherboard (also referred to as a mainboard), which is a printed circuit board (PCB) with embedded conductors organized as transmission lines between processor 702, memory 704, chipset 706, and/or other components of the information handling system. The components may be coupled to the motherboard through packaging connections such as a pin grid array (PGA), ball grid array (BGA), land grid array (LGA), surface-mount technology, and/or through-hole technology. In some embodiments, processor 702, memory 704, chipset 706, and/or other components may be organized as a System on Chip (SoC).

Processor 702 may execute program code by accessing instructions loaded into memory 704 from a storage device, executing the instructions to operate on data also loaded into memory 704 from a storage device, and generate output data that is stored back into memory 704 or sent to another component. Processor 702 may include processing cores capable of implementing any of a variety of instruction set architectures (ISAs), such as the x86, POWERPC®, ARM®, SPARC®, or MIPS® ISAs, or any other suitable ISA. In multi-processor systems, each of processors 702 may commonly, but not necessarily, implement the same ISA. In some embodiments, multiple processors may each have different configurations such as when multiple processors are present in a big-little hybrid configuration with some high-performance processing cores and some high-efficiency processing cores. Chipset 706 may facilitate the transfer of data between processor 702, memory 704, and other components. In some embodiments, chipset 706 may include two or more integrated circuits (ICs), such as a northbridge controller coupled to processor 702, memory 704, and a southbridge controller, with the southbridge controller coupled to the other components such as USB 710, SATA 720, or PCIe buses 708. Chipset 706 may couple to other components through one or more PCIe buses 708.

Some components may be coupled to one bus line of PCIe buses 708, whereas some components may be coupled to more than one bus line of PCIe buses 708. One example component is a universal serial bus (USB) controller 710, which interfaces the chipset 706 to a USB bus 712. USB bus 712 may couple input/output components such as a keyboard 714 and a mouse 716, but also other components such as USB flash drives, or another information handling system. In some implementation, mouse 716 may include or correspond to device 100, 200, 400, 600, or the like. Another example component is a SATA bus controller 720, which couples the chipset 706 to a SATA bus 722. SATA bus 722 may facilitate efficient transfer of data between chipset 706 and components coupled to the chipset 706 and a storage device 724 (e.g., a hard disk drive (HDD) or solid-state disk drive (SDD)) and/or a compact disc read-only memory (CD-ROM) 726. PCIe bus 708 may also couple chipset 706 directly to a storage device 728 (e.g., a solid-state disk drive (SDD)). A further example of an example component is a graphics device 730 (e.g., a graphics processing unit (GPU)) for generating output to a display device 732, a network interface controller (NIC) 740, and/or a wireless interface 750 (e.g., a wireless local area network (WLAN) or wireless wide area network (WWAN) device) such as a Wi-Fi® network interface, a Bluetooth® network interface, a GSM® network interface, a 3G network interface, a 4G LTE® network interface, and/or a 5G NR network interface (including sub-6 GHz and/or mmWave interfaces). In one example embodiment, chipset 706 may be directly connected to an individual end point via a PCIe root port within the chipset and a point-to-point topology as shown in FIG. 7.

Chipset 706 may also be coupled to a serial peripheral interface (SPI) and/or Inter-Integrated Circuit (I2C) bus 760, which couples chipset 706 to system management components. For example, a non-volatile random-access memory (NVRAM) 770 for storing firmware 772 may be coupled to bus 760. As another example, a controller, such as a baseboard management controller (BMC) 780, may be coupled to the chipset 706 through the bus 760. BMC 780 may be referred to as a service processor or embedded controller (EC). Capabilities and functions provided by BMC 780 may vary considerably based on the type of information handling system. For example, the term baseboard management system may be used to describe an embedded processor included at a server, while an embedded controller may be found in a consumer-level device. As disclosed herein, BMC 780 represents a processing device different from processor 702, which provides various management functions for information handling system 700. For example, an embedded controller may be responsible for power management, cooling management, and the like. An embedded controller included at a data storage system may be referred to as a storage enclosure processor or a chassis processor.

Information handling system 700 may include additional processors that are configured to provide localized or specific control functions, such as a battery management controller. Bus 760 can include one or more busses, including a Serial Peripheral Interface (SPI) bus, an Inter-Integrated Circuit (I2C) bus, a system management bus (SMBUS), a power management bus (PMBUS), or the like. BMC 780 may be configured to provide out-of-band access to devices at information handling system 700. Out-of-band access in the context of the bus 760 may refer to operations performed prior to execution of firmware 772 by processor 702 to initialize operation of information handling system 700.

Firmware 772 may include instructions executable by processor 702 to initialize and test the hardware components of information handling system 700. For example, the instructions may cause the processor 702 to execute a power-on self-test (POST). The instructions may further cause the processor 702 to load a boot loader or an operating system (OS) from a mass storage device. Firmware 772 additionally may provide an abstraction layer for the hardware, such as a consistent way for application programs and operating systems to interact with the keyboard, display, and other input/output devices. When power is first applied to information handling system 700, the system may begin a sequence of initialization procedures, such as a boot procedure or a secure boot procedure. During the initialization sequence, also referred to as a boot sequence, components of information handling system 700 may be configured and enabled for operation and device drivers may be installed. Device drivers may provide an interface through which other components of information handling system 700 can communicate with a corresponding device. Firmware 772 may include a basic input-output system (BIOS) and/or include a unified extensible firmware interface (UEFI). Firmware 772 may also include one or more firmware modules of the information handling system. Additionally, configuration settings for Firmware 772 and firmware of the information handling system 700 may be stored in the NVRAM 770. NVRAM 770 may, for example, be a non-volatile firmware memory of information handling system 700 and may store a firmware memory map namespace of information handling system 700. NVRAM 770 may further store one or more container-specific firmware memory map namespaces for one or more containers concurrently executed by the information handling system.

Information handling system 700 may include additional components and additional busses, not shown for clarity. For example, information handling system 700 may include multiple processor cores (either within processor 702 or separately coupled to chipset 706 or through the PCIe buses 708), audio devices (such as may be coupled to chipset 706 through one of the PCIe busses 708), or the like. While a particular arrangement of bus technologies and interconnections is illustrated for the purpose of example, one of skill will appreciate that the techniques disclosed herein are applicable to other system architectures. Information handling system 700 may include multiple processors and/or redundant bus controllers. In some embodiments, one or more components may be integrated together in an integrated circuit (IC), which is circuitry built on a common substrate. For example, portions of chipset 706 can be integrated within processor 702. Additional components of information handling system 700 may include one or more storage devices that may store machine-executable code, one or more communications ports for communicating with external devices, and various input and output (I/O) devices, such as a keyboard, a mouse, and a video display.

In some embodiments, processor 702 may include multiple processors, such as multiple processing cores for parallel processing by the information handling system 700. For example, information handling system 700 may include a server comprising multiple processors for parallel processing. In some embodiments, information handling system 700 may support virtual machine (VM) operation, with multiple virtualized instances of one or more operating systems executed in parallel by information handling system 700. For example, resources, such as processors or processing cores of the information handling system may be assigned to multiple containerized instances of one or more operating systems of information handling system 700 executed in parallel. A container may, for example, be a virtual machine executed by information handling system 700 for execution of an instance of an operating system by information handling system 700. Thus, for example, multiple users may remotely connect to information handling system 700, such as in a cloud computing configuration, to utilize resources of information handling system 700, such as memory, processors, and other hardware, firmware, and software capabilities of information handling system 700. Parallel execution of multiple containers by information handling system 700 may allow information handling system 700 to execute tasks for multiple users in parallel secure virtual environments.

The flow chart diagram of FIG. 5 is generally set forth as a logical flow chart diagram. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The above specification and examples provide a complete description of the structure and use of illustrative implementations. Although certain examples have been described above with a certain degree of particularity, or with reference to one or more individual examples, those skilled in the art could make numerous alterations to the disclosed implementations without departing from the scope of this invention. As such, the various illustrative implementations of the methods and systems are not intended to be limited to the particular forms disclosed. Rather, they include all modifications and alternatives falling within the scope of the claims, and examples other than the one shown may include some or all of the features of the depicted example. For example, elements may be omitted or combined as a unitary structure, and/or connections may be substituted. Further, where appropriate, aspects of any of the examples described above may be combined with aspects of any of the other examples described to form further examples having comparable or different properties and/or functions, and addressing the same or different problems. Similarly, it will be understood that the benefits and advantages described above may relate to one embodiment or may relate to several implementations.

The operations described above as performed by a controller may be performed by any circuit configured to perform the described operations. Such a circuit may be an integrated circuit (IC) constructed on a semiconductor substrate and include logic circuitry, such as transistors configured as logic gates, and memory circuitry, such as transistors and capacitors configured as dynamic random access memory (DRAM), electronically programmable read-only memory (EPROM), or other memory devices. The logic circuitry may be configured through hard-wire connections or through programming by instructions contained in firmware. Further, the logic circuitry may be configured as a general purpose processor capable of executing instructions contained in software and/or firmware.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. For example, although processors are described throughout the detailed description, aspects of the invention may be applied to the design of or implemented on different kinds of processors, such as graphics processing units (GPUs), central processing units (CPUs), and digital signal processors (DSPs). As another example, although processing of certain kinds of data may be described in example embodiments, other kinds or types of data may be processed through the methods and devices described above. As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. An apparatus comprising:
a housing comprising a cavity for a trackball;
a first mounting assembly attached to the housing, the first mounting assembly comprising a first wheel assembly comprising:
a first wheel coupled to the trackball and configured to rotate about a first axis; and
a first brake system configured to apply a first braking force to the first wheel, the first brake system comprising a first magnetorheological fluid (MRF) rotational brake, the first MRF rotational brake configured to apply the first braking force to the first wheel to adjust a first resistance applied to the trackball in a first direction of rotation of the trackball;
a second mounting assembly attached to the housing, the second mounting assembly comprising a second wheel assembly comprising:
a second wheel coupled to the trackball and configured to rotate about a second axis; and
a second brake system configured to apply a second braking force to the second wheel, the second brake system comprising a second magnetorheological fluid (MRF) rotational brake, the second MRF rotational brake configured to apply the second braking force to the second wheel to adjust a second resistance applied to the trackball in a second direction of rotation of the trackball, and
an optical sensor attached to the housing, the sensor configured to measure a breaking force applied by the first brake system and the second brake system,
wherein the second braking force is different from the first braking force and the second braking force is independently controlled from the first braking force.

2. The apparatus of claim 1, wherein the first wheel includes one or more rollers configured to contact the trackball.

3. The apparatus of claim 2, wherein the one or more rollers include a plurality of rollers positioned and radially spaced about a circumferential portion of the first wheel.

4. The apparatus of claim 2, wherein each roller of the one or more rollers has a roller axis about which the roller is configured to rotate, and each roller axis is offset from the first axis, and each roller of the one or more rollers is included in a plane that is perpendicular to a plane that includes the first axis.

5. The apparatus of claim 1, wherein the first wheel is configured to contact the trackball and includes a material having a coefficient of friction such that rotation of the trackball in a direction perpendicular to the first axis causes rotation of the first wheel about the first axis.

6. The apparatus of claim 1, further comprising:
a third wheel coupled to the trackball and configured to rotate about a third axis; and a third brake system configured to apply a third braking force to the third wheel,
wherein the third braking force different from is controlled independently from the first braking force and the second braking force.

7. The apparatus of claim 1, wherein the optical sensor is further configured to detect movement of the trackball.

8. The apparatus of claim 7, further comprising a controller coupled to the optical sensor and configured to control operation of the first braking system.

9. The apparatus of claim 8, wherein the controller is configured to:
receive, from the optical sensor, position data associated with operation of the trackball;
receive, from an information handling system, a first input associated with a display, the display based on the operation of the trackball;
generate, based on the first input, a first output associated with the first braking force; and
transmit the first output to the first brake system to cause the first braking force to be applied to the first wheel.

10. The apparatus of claim 8, further comprising:
an interface configured to communicate with an information handling system; and
a power source coupled to the controller, the first braking system, or a combination thereof.

11. The apparatus of claim 1, wherein:
the first wheel includes a first plurality of rollers configured to contact the trackball, the a first plurality of rollers positioned and radially spaced about a circumferential portion of the first wheel; and
the second wheel includes a second plurality of rollers configured to contact the trackball, the second plurality of rollers positioned and radially spaced about a circumferential portion of the second wheel.

\* \* \* \* \*